United States Patent [19]

Iwasama et al.

[11] 4,393,340

[45] Jul. 12, 1983

[54] MOTOR SPEED CONTROL DEVICE

[75] Inventors: Teruo Iwasama; Hitomi Tojiki, both of Hachioji, Japan

[73] Assignee: Olympus Optical Company Limited, Tokyo, Japan

[21] Appl. No.: 272,378

[22] Filed: Jun. 10, 1981

[30] Foreign Application Priority Data

Jun. 11, 1980 [JP] Japan ................................. 55/78503

[51] Int. Cl.$^3$ ............................................. H02P 5/16
[52] U.S. Cl. .................................. 318/301; 318/328; 318/309
[58] Field of Search ................................ 318/309–311, 318/315, 317–318, 301, 326, 328, 345, 345 LA, 345 AB, 677–679, 327

[56] References Cited

U.S. PATENT DOCUMENTS

| | | | |
|---|---|---|---|
| 3,740,633 | 6/1973 | Buttafava | 318/328 |
| 4,034,274 | 7/1977 | Akima | 318/328 |
| 4,153,864 | 5/1976 | Minakuchi | 318/328 |

Primary Examiner—J. V. Truhe
Assistant Examiner—A. Evans
Attorney, Agent, or Firm—Toren, McGeady and Stanger

[57] ABSTRACT

A motor speed control device comprises means for generating pulse output corresponding to the revolution speed of the motor, means for generating saw-tooth wave output in synchronization with the pulse output, means for generating reference voltage, a current mirror load differential amplifier including a first amplifier element having a first current mirror circuit connected as load and supplied with the saw-tooth wave output and a second amplifier element having a second current mirror circuit connected as load and supplied with the reference voltage and for supplying current to the first or second current mirror circuit corresponding to the result of comparing the reference voltage with the saw-tooth wave output, an integrating circuit to be charged or discharged by the charging current flowing through one of the first and second current mirror circuits and the discharging current flowing through the other of both circuits, and means for driving the motor by output of the integrating circuit. The motor speed control device is used for electronic apparatuses such as a tape recorder.

4 Claims, 11 Drawing Figures

MOTOR SPEED CONTROL DEVICE

BACKGROUND OF THE INVENTION

1. Field of the Invention

The present invention relates to motor speed control devices and more particularly to a motor speed control device which functions stably at low voltage source.

2. Description of Prior Art

Electronic apparatuses such as a tape recorder are apt to be subminiaturized in recent years. This permits use of the driving power source of low voltage.

Following example is a motor speed control device in prior art which is used for a tape recorder and operated by low voltage. FIG. 1 shows a block diagram of the speed control device in prior art, and FIG. 2 shows a time chart of the device in FIG. 1. The speed control device comprises a tachometer generator 2 connected directly to output shaft of a motor 1 and generating alternating voltage with frequency proportional to the revolution speed of the motor 1 as shown in FIG. 2(a). The alternating voltage is transformed into square wave as shown in FIG. 2(b) by a wave shaping circuit 3 and then supplied to a trigger pulse generator 4. Trigger signal is generated corresponding to leading edge (or trailing edge) of the square wave as shown in FIG. 2(c), and signal with prescribed time width $T_T$ as shown in FIG. 2(d) is generated by a timer circuit 5 in synchronization with the trigger signal. The signal with time width $T_T$ is supplied to an integral control circuit 6 thereby charge or discharge state of a capacitor 7 is controlled as shown in FIG. 2(e). The output produced by charging or discharging the capacitor 7 is passed through a low-pass filter and becomes the frequency-/voltage tranducing output, which is amplified by a buffer circuit 8 into sufficient power to drive the motor 1. The revolution speed of the motor 1 is controlled by the buffer output and held constant using negative feedback in the control system.

The integral control circuit 6 as principal part of the control system is specifically constituted as shown in FIG. 3. In the integral control circuit 6, transistors $Q_1$, $Q_7$, $Q_6$ constitute a current mirror circuit. A constant-current circuit IS is connected to collector of the transistor $Q_1$, and current flows through the transistor $Q_6$ at a specified ratio with respect to that in the constant-current circuit IS. A transistor $Q_1$ serves to control base current of the transistors $Q_1$, $Q_6$, $Q_7$. Another current mirror circuit is constituted by transistors $Q_4$, $Q_3$. The transistors $Q_3$ and $Q_4$ are connected respectively to collectors of the transistors $Q_7$ and $Q_6$. Thereby current flows through the transistor $Q_4$ also at a specified ratio with respect to that in the constant-current circuit IS. A transistor $Q_5$ is connected between base and emitter of the transistor $Q_3$, and the timer circuit 5 is connected to base of the transistor $Q_5$. In FIG. 3, Vcc designates the DC power source and $C_1$ corresponds to the capacitor 7.

In the above mentioned constitution, if the transistor $Q_5$ turns ON or OFF corresponding to high or low level of output of the timer circuit 5, bias of the transistor $Q_3$ turns ON or OFF thereby current in the transistor $Q_4$ is switched. Charging or discharging current of the capacitor $C_1$ is changed, and suitable selection of the charging/discharging current ratio enables gain of the control system to vary.

In conventional manner, monostable multivibrator is commonly used in the timer circuit 5 to provide signal for changing charge or discharge state. Referring to FIG. 1 again, if the revolution speed of the motor rises rapidly and the pulse generating interval by the trigger pulse generator 4 becomes less than the operating time of the multivibrator ($T_T$ shown in FIG. 2(d)) and a plurality of trigger pulses are supplied in the time interval $T_T$, the timer circuit 5 ignores all of the trigger pulses thereby charge or discharge state of the capacitor 7 does not respond to the speed of the motor 1. This may cause the speed control of the motor 1 to be unstable.

In order to eliminate such unstable control, use of two time-constant circuits or digital processing has been proposed. However, every proposal requires increase of outer parts and circuit elements therefore the apparatus becomes expensive and large in size. Accordingly, conventional manner has defect in obstructing needs to miniaturize apparatuses.

SUMMARY OF THE INVENTION

An object of the present invention is to eliminate the above described defect of the motor speed control device.

Another object of the invention is to provide a motor speed control device which can control the motor speed stably and is simple in circuit constitution, adapted for operation in low voltage and suitable for constitution by IC elements.

A still another object of the invention is to provide a motor speed control device which can prevent the estimated value of control from varying dependent on the temperature variation and carry out the good control action.

According to the present invention, a motor speed control device comprises means for generating pulse output corresponding to the revolution speed of the motor; means for generating saw-tooth wave output in synchronization with the pulse output; means for generating reference voltage; a current mirror load differential amplifier including a first amplifier element having a first current mirror circuit connected as load and supplied with the saw-tooth wave output and a second amplifier element having a second current mirror circuit connected as load and supplied with the reference voltage, and supplying current to the first or second current mirror circuit corresponding to the result of comparing the reference voltage with the saw-tooth wave output; an integrating circuit to be charged or discharged by the charging current flowing through one of the first and second current mirror circuits and the discharging current flowing through the other of both current mirror circuits; and means for driving the motor by output of the integrating circuit.

The current mirror load differential amplifier has the second current mirror circuit composed of a pair of transistors wherein emitter area of one transistor is N times as large as that of other transistor and emitter area of the second amplifier element is N times as large as that of the first amplifier element.

DESCRIPTION OF THE PREFERRED EMBODIMENTS

Figure 1:
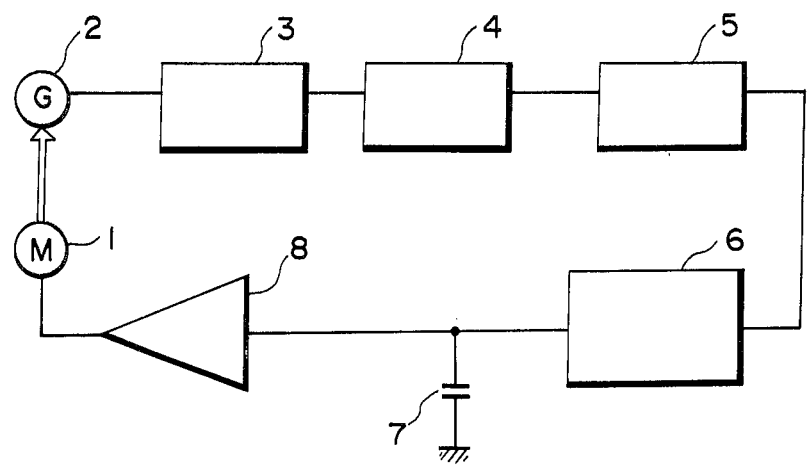
FIG. 1 is a block diagram of a motor speed control device in prior art.
Figure 2:
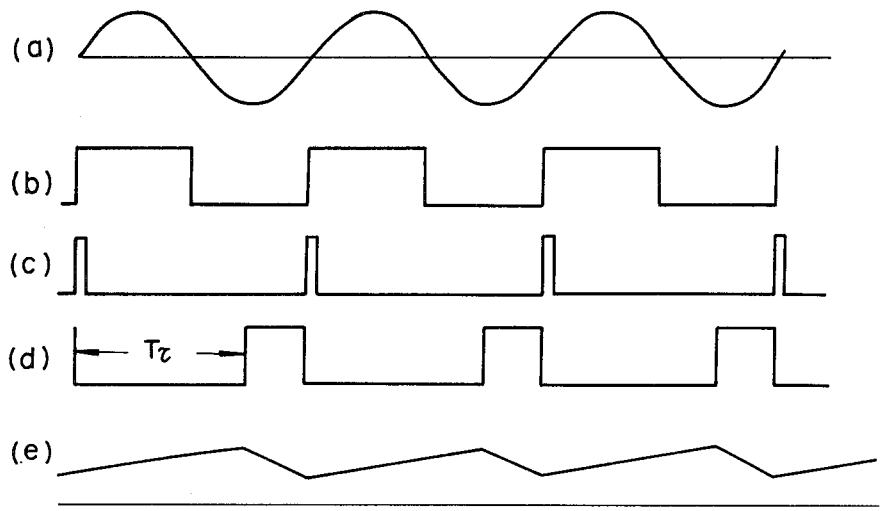
FIG. 2 is a time chart illustrating operation of the control device in FIG. 1.
Figure 3:
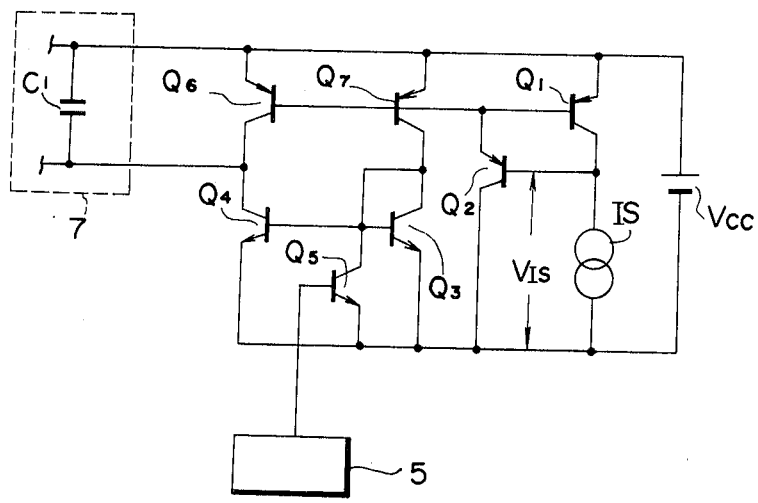
FIG. 3 is a circuit diagram of an integral control circuit used in the control device of FIG. 1.
Figure 4:
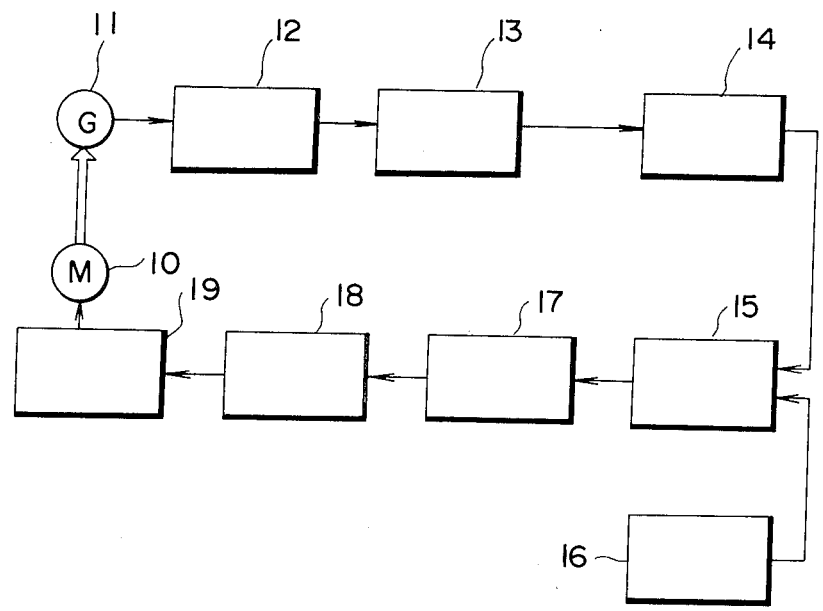
FIG. 4 is a block diagram of a motor speed control device in an embodiment of the present invention.

In FIG. 4 illustrating the constitution of an embodiment of the present invention schematically, numeral 10 designates a motor to be controlled. A tachometer generator 11 is connected to output shaft of the motor 10 and output end of the tachometer generator 11 is connected to a wave shaping circuit 12. Output end of the wave shaping circuit 12 is connected through a reset pulse generator 13 and a saw-tooth wave generator 14 to one input terminal of a current mirror load differential amplifier 15. Other input terminal of the differential amplifier 15 is connected to output end of a reference voltage generator 16. Output end of the current mirror load differential amplifier 15 is connected through a charge/discharge changing circuit 17, an integrating circuit 18 and a buffer circuit 19 to the motor 10.

Figure 5:
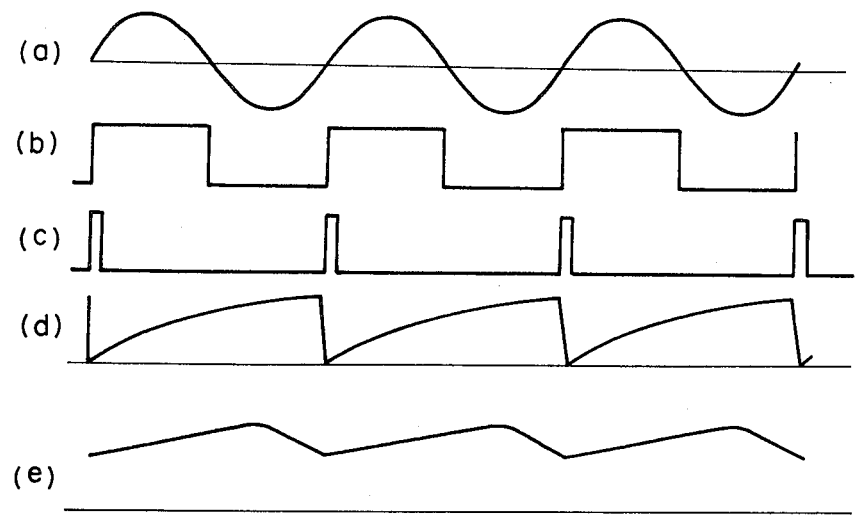
FIG. 5 is a time chart illustrating operation of the control device in the embodiment.

Operation of the speed control device will now be described. The tachometer generator 11 generates alternating voltage with frequency proportional to the revolution speed of the motor 10 as shown in FIG. 5(a). The alternating voltage is transformed into square wave as shown in FIG. 5(b) by the wave shaping circuit 12 and then supplied to the reset pulse generator 13. Trigger signal shown in FIG. 5(c) is generated corresponding to leading edge (or trailing edge) of the square wave. Saw-tooth wave output as shown in FIG. 5(d) is produced by the saw-tooth wave generator 14 in synchronization with the trigger signal. The saw-tooth wave output and the reference voltage of the reference voltage generator 16 are supplied to the current mirror load differential amplifier 15. The charge/discharge changing circuit 17 responds to output of the differential amplifier 15, thereby the charging or discharging state of the integrating circuit 18 is changed in analog processing at a value nearly equal to the reference voltage, thus the frequency/voltage transducing output as shown in FIG. 5(e) is obtained. The transducing output is amplified by the buffer circuit 19 into sufficient power to drive the motor 10. The revolution speed of the motor 10 is controlled by the buffer output and held constant using negative feedback in the control system.

Figure 6:
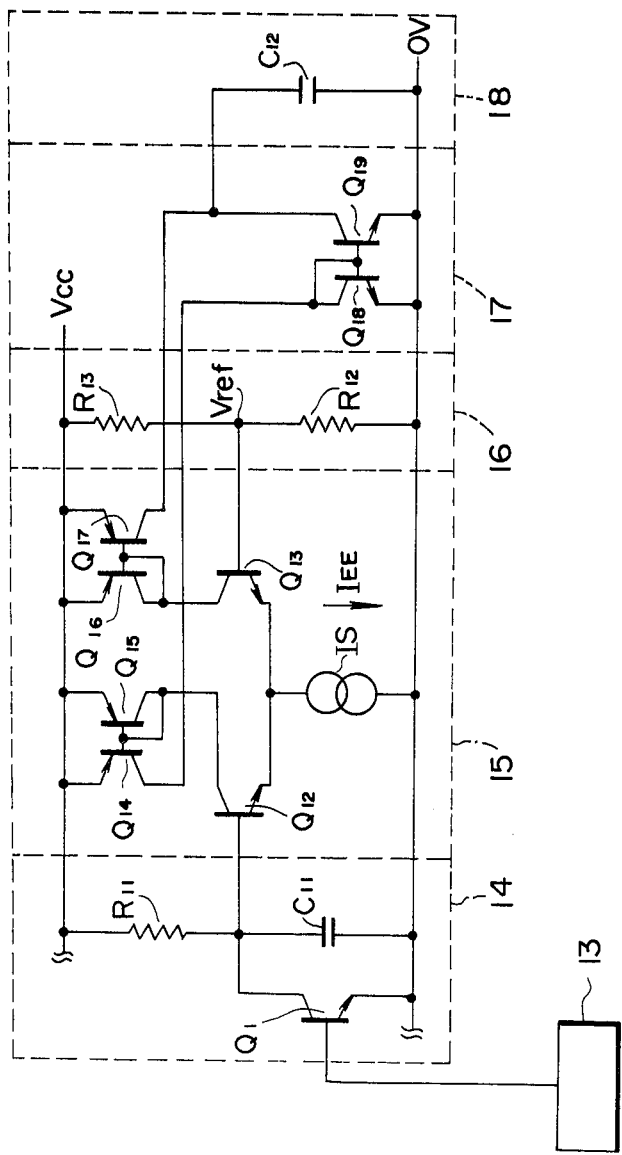
FIG. 6 is a circuit diagram illustrating principal part of the control device in the embodiment.

Principal part of the control system is constituted as shown in FIG. 6, where parts corresponding to FIG. 4 are designated by the same reference numerals as in FIG. 4. The saw-tooth wave generator 14 connected to the reset pulse generator 13 comprises a transistor $Q_{11}$, a resistor $R_{11}$, and a capacitor $C_{11}$. The transistor $Q_{11}$ serves to discharge the capacitor $C_{11}$ and reset the output voltage. After the reset, the output voltage rises exponentially at the time constant of the capacitor $C_{11}$ and the resistor $R_{11}$ towards the supply voltage Vcc. The reference voltage generator 16 comprises series circuit of resistors $R_{12}$ and $R_{13}$, and generates the following reference voltage Vref when the supply voltage is Vcc.

$$V_{ref} = \frac{R_{12}}{R_{12} + R_{13}} V_{cc} \quad (1)$$

Figure 7:
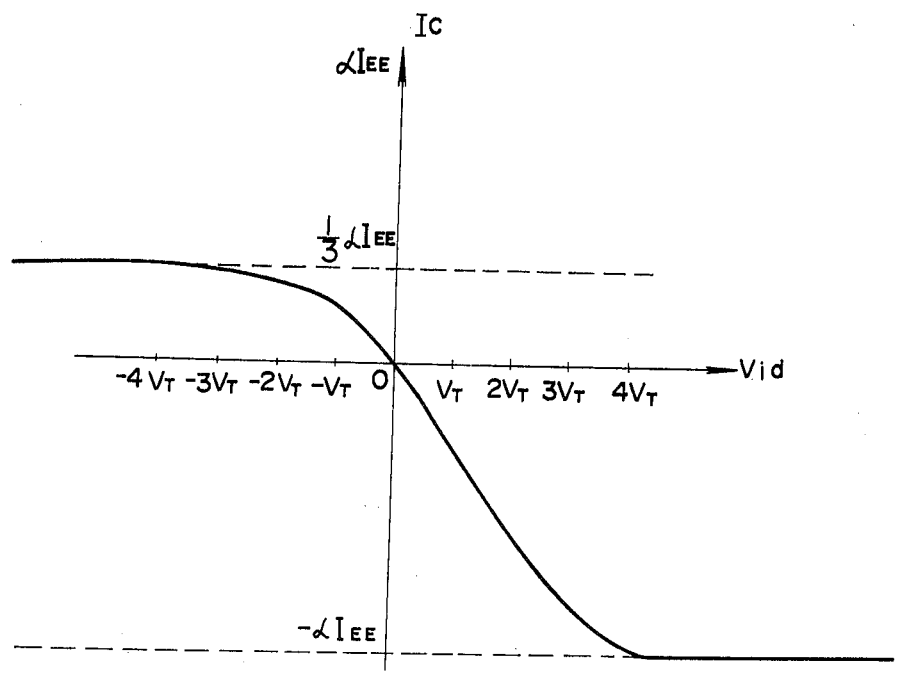
FIG. 7 is a transfer characteristic diagram of a current mirror load differential amplifier used in the embodiment.

The current mirror load differential amplifier 15 to which the saw-tooth wave generator 14 and the reference voltage generator 16 are connected comprises transistors $Q_{12}$, $Q_{13}$, $Q_{14}$, $Q_{15}$, $Q_{16}$, $Q_{17}$ and a constant-current circuit IS. Current mirror circuits are constituted respectively by $Q_{14}$ and $Q_{15}$; and $Q_{16}$ and $Q_{17}$. The transistor $Q_{12}$ constitutes an amplifier element having the transistors $Q_{14}$, $Q_{15}$ as load; $Q_{13}$ constitutes another amplifier element having the transistors $Q_{16}$, $Q_{17}$ as load. The differential amplifier 15 has transfer characteristics as shown in FIG. 7.

Assuming that the transistors $Q_{12}$ and $Q_{13}$ constitute a proper pair, when base potential $Vb_{Q2}$ of the transistor $Q_{12}$ is sufficiently low in comparison to the reference voltage Vref, collector current $Ic_{Q3}$ of the transistor $Q_{13}$ and collector current $Ic_{Q2}$ of the transistor $Q_{12}$ are determined by following equations.

$$Ic_{Q3} = \alpha I_{EE} \quad (2)$$

$$Ic_{Q2} = 0 \quad (3)$$

in which $\alpha$ is current amplification factor of transistor; $I_{EE}$ is current value in the constant-current circuit IS. That is, current flows only through collector of the transistor $Q_{13}$ in this condition.

On the contrary, if base potential $Vb_{Q2}$ of the transistor $Q_{12}$ is sufficiently high in comparison to the reference voltage Vref, $Ic_{Q3}$ and $Ic_{Q2}$ are determined by following equations.

$$Ic_{Q3} = 0 \quad (4)$$

$$Ic_{Q2} = \alpha I_{EE} \quad (5)$$

Current flows only through collector of the transistor $Q_{12}$ in this condition.

Assuming that $V_T$ (thermal voltage) is represented by $$V_T = kT/q \quad (6)$$

in equation (6) k is Boltzmann constant; T is absolute temperature; q is electron charge, and voltage difference Vid between base potential $Vb_{Q2}$ of the transistor $Q_{12}$ and base potential $Vb_{Q3}$ of the transistor $Q_{13}$ is represented by $$Vid = Vb_{Q2} - Vb_{Q3} \quad (7)$$

Figure 8:
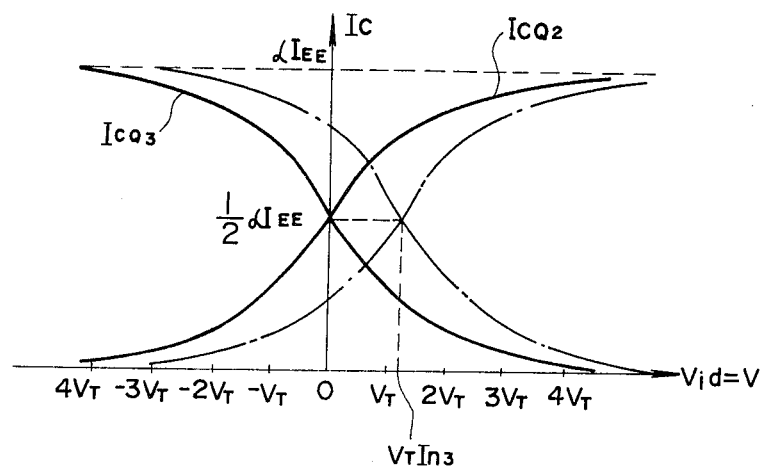
FIG. 8 is a characteristic diagram illustrating operation of the embodiment.

When $|Vid| < 4V_T$, i.e. difference between base potential of the transistor $Q_{12}$ and base potential of the transistor $Q_{13}$ is $4 V_T$ (about 0.1 V at normal temprature), characteristics of collector current $Ic_{Q2}$ of the transistor $Q_{12}$ and collector current $Ic_{Q3}$ of the transistor $Q_{13}$ are represented by solid lines in FIG. 8. That is, analog processing is carried out at this voltage. If relation of saturation current $Is_{Q2}$, $Is_{Q3}$ of the transistors $Q_{12}$, $Q_{13}$ is represented by $Is_{Q2} = Is_{Q3}$ and relation of base-emitter voltage $Vbe_{Q2}$, $Vbe_{Q3}$ is represented by $Vbe_{Q2}$, $Vbe_{Q3} >> V_T$ following equations are derived from Ebers-Moll equations.

$$Ic_{Q2} = \frac{\alpha I_{EE}}{1 + \exp\left(-\frac{Vid}{V_T}\right)} \qquad (8)$$

$$Ic_{Q3} = \frac{\alpha I_{EE}}{1 + \exp\left(\frac{Vid}{V_T}\right)} \qquad (9)$$

Collector current of the transistor $Q_{12}$ represented by equation (8) is used as the discharging current of the capacitor $C_{12}$ constituting the integrating circuit 18; collector current of the transistor $Q_{13}$ represented in equation (9) is used as the charging current of the capacitor $C_{12}$. The charge/discharge changing circuit 17 is constituted by the current mirror circuit of the transistors $Q_{18}$, $Q_{19}$.

Accordingly, such a constitution that charging or discharging of the capacitor in the integrating circuit is carried out corresponding to result of comparing the saw-tooth wave output produced in frequency proportional to the revolution speed of the motor with the reference voltage can charge or discharge the capacitor more stably than in conventional timer circuit using monostable multivibrator therefore good control function of the motor speed may be expected. Above mentioned analog processing has advantages in reducing the number of elements at IC constitution thereby simplifying the circuit constitution. Distribution of voltage drop that one base-emitter voltage $V_{BE}$ is fixed and others are supplied to collector-emitter voltage $V_{CE}$ of the transistor permits the working at low voltage. Principal circuit portion of this idea is recognized to act even at 1 volt.

Figure 9:
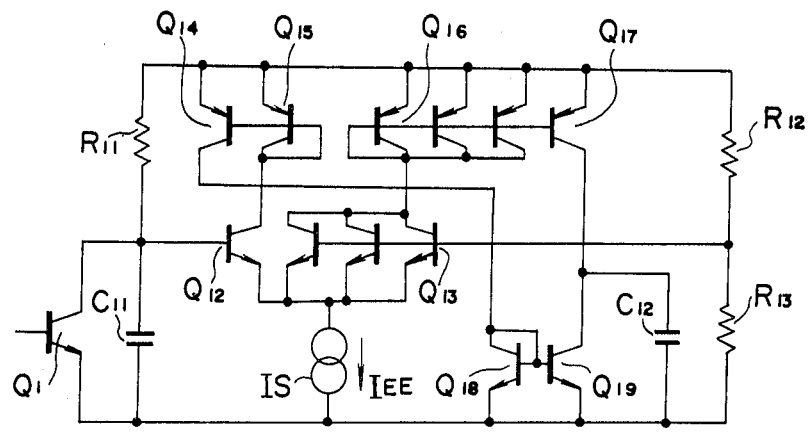
FIG. 9 is a circuit diagram illustrating another embodiment of the invention.

Although the charging/discharging current ratio is not particularly considered in the above description of FIG. 6, gain as the control system is increased by increasing the charging/discharging current ratio. This is realized by varying emitter area of the transistor constituting the current mirror circuit in the current mirror load differential amplifier 15 as shown in FIG. 9. Referring to FIG. 9, the transistors $Q_{14}$ and $Q_{15}$ as load of the transistor $Q_{12}$ constituting the differential amplifier are equal in emitter surface therefore in collector current. Ratio of emitter area in the transistors $Q_{16}$ and $Q_{17}$ as load of the transistor $Q_{13}$ is 3:1 therefore collector current of the transistor $Q_{17}$ is ⅓ with respect to that of the transistor $Q_{16}$. Other parts in FIG. 9 are the same as those in FIG. 6. The same parts are designated by the same numerals and description thereof is omitted.

Assuming $Vid > 4 V_T$, when the transistor $Q_{12}$ is turned ON, collector current $Ic_{Q4}$ of the transistor $Q_{14}$ becomes $$Ic_{Q4} \approx \alpha I_{EE} \qquad (10)$$

Assuming $Vid < -4 V_T$, when the transistor $Q_{13}$ is turned ON, collector current $Ic_{Q7}$ of the transistor $Q_{17}$ becomes $$Ic_{Q7} \approx \tfrac{1}{3}\alpha I_{EE} \qquad (11)$$

At the charge/discharge changing point, i.e. when $Ic_{Q4} = Ic_{Q7}$, relation of collector current $Ic_{Q5}$ of the transistor $Q_{15}$ and collector current $Ic_{Q6}$ of the transistor $Q_{16}$ becomes $$Ic_{Q6} = 3Ic_{Q5}$$

therefore $$Ic_{Q3} = Ic_{Q2} \qquad (12)$$

Assuming that the transistors $Q_{12}$ and $Q_{13}$ are equal in emitter area, solving of equation (12) at simultaneous equations with (8) (9) derives following equation.

$$Vid = -V_T \ln 3$$

That is, when $Vb_{Q2}$ is lower than $Vb_{Q3}$ by amount $V_T \ln 3$, charging or discharging state is changed. However, since $V_T$ is function of temperature, equal emitter area in the transistors $Q_{12}$ and $Q_{13}$ results in variation of the expected value of control dependent on the temperature variation.

Figure 10:
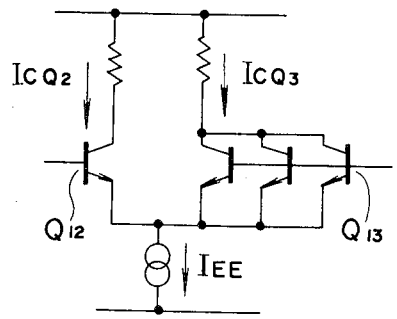
FIG. 10 is a circuit diagram illustrating a further embodiment of the invention.

In order to eliminate the above mentioned defect, emitter area of the transistor $Q_{13}$ is made three times as large as that of the transistor $Q_{12}$. Such constitution of the differential amplifier is shown in FIG. 10.

DC characteristics of the above mentioned differential amplifier are derived when $Is_{Q3} = 3Is_{Q2}$ from Evers-Moll equations $$Ic_Q = \frac{I_{EE}}{1 + \exp\left(\frac{-(Vid - V_T \ln 3)}{V_T}\right)} \qquad (13)$$

$$Ic_Q = \frac{I_{EE}}{1 + eqp\left(\frac{Vid - V_T \ln 3}{V_T}\right)} \qquad (14)$$

Collector currents in equations (13) (14) are represented in dash-and-dot lines in FIG. 8 and formed from above mentioned equations (8) (9) in transferring in parallel to the Vid axis direction by the amount $V_T \ln 3$. Substituting equation (12) specifying the charge/discharge changing condition in (13) (14)

$$Vid = 0$$

Therefore the charging state is changed when $Vb_{Q2}$ is equal to $Vb_{Q3}$. Thus the expected value of control does not vary dependent on the temperature variation.

In order to make charge/discharge ratio to be N, emitter area being N times as large as that of the transistor $Q_6$ results in charge/discharge changing when Vid is $-V_T \ln N$, and emitter area of the transistor $Q_{13}$ is made N times as large as that of $Q_{12}$ so as to cancel the changing voltage of Vid dependent on the temperature variation. Thus the expected value of control does not vary dependent on the temperature variation and good control action of the motor speed is obtained.

Figure 11:
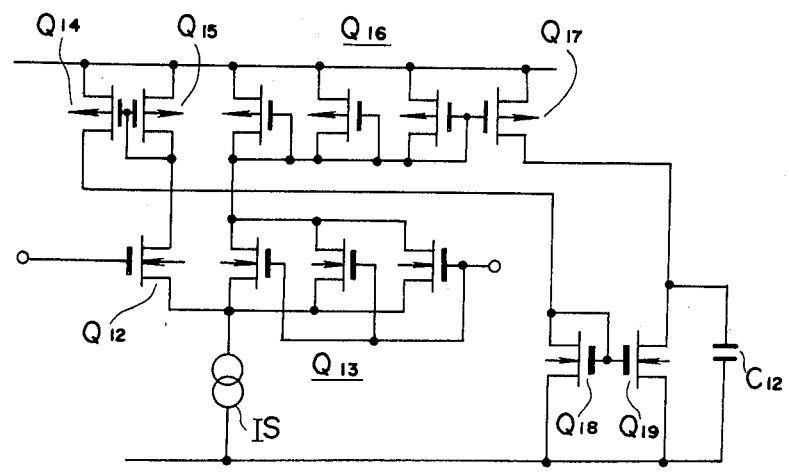
FIG. 11 is a circuit diagram illustrating a still another embodiment of the invention.

It is to be understood that the invention be not limited to the above mentioned embodiment but widely different modification may be made without departing from the spirit and scope of the invention. For example, the invention may be constituted using MOSIC elements in place of transistors as shown in FIG. 11. In FIG. 11, parts corresponding FIG. 9 are designated by the same numerals as in FIG. 9.

What is claimed is:

1. A motor speed control device, comprising:

means for generating pulse output corresponding to the revolution speed of the motor;

means for generating saw-tooth output in synchronization with the pulse output;

means for generating reference voltage;

a current mirror load differential amplifier including a first amplifier element having a first current mirror circuit connected as load and supplied with the saw-tooth wave output and a second amplifier element having a second current mirror circuit connected as load and supplied with the reference voltage, and supplying current to the first or second current mirror circuit corresponding to the result of comparing the reference voltage with the saw-tooth wave output;

an integrating circuit to be charged or discharged by the charging current flowing through one of the first and second current mirror circuits and the discharging current flowing through the other of both current mirror circuits; and means for driving the motor by output of the integrating circuit.

2. A motor speed control device according to claim 1, wherein said current load differential amplifier has the second current mirror circuit composed of a pair of transistors, emitter area of one transistor is N times as large as that of other transistor, and emitter area of the second amplifier element is N times as large as that of the first amplifier element.

3. A motor speed control device according to claim 2, wherein emitter area of one transistor in a pair of transistors in said second current mirror circuit is three times as large as that of other transistor, and emitter area of the second amplifier element is three times as large as that of the first amplifier element.

4. A motor speed control device according to any one of claims 1 to 3, wherein MOS transistors are used in said transistors and the device is constituted by IC elements.

* * * * *